(12) United States Patent
Monno et al.

(10) Patent No.: US 9,123,471 B2
(45) Date of Patent: Sep. 1, 2015

(54) BIAXIALLY STRETCHED POLYPROPYLENE FILM, METALLIZED FILM AND FILM CAPACITOR

(75) Inventors: Teruo Monno, Tsuchiura (JP); Tetsuya Asano, Tsuchiura (JP); Masami Sugata, Tsuchiura (JP); Takanori Nakatsuka, Tsuchiura (JP)

(73) Assignee: Toray Industries, Inc. (JP)

( * ) Notice: Subject to any disclaimer, the term of this patent is extended or adjusted under 35 U.S.C. 154(b) by 161 days.

(21) Appl. No.: 14/004,068

(22) PCT Filed: Mar. 6, 2012

(86) PCT No.: PCT/JP2012/055708
§ 371 (c)(1),
(2), (4) Date: Sep. 9, 2013

(87) PCT Pub. No.: WO2012/121256
PCT Pub. Date: Sep. 13, 2012

(65) Prior Publication Data
US 2014/0016244 A1    Jan. 16, 2014

(30) Foreign Application Priority Data
Mar. 10, 2011    (JP) .................................. 2011-052565

(51) Int. Cl.
| | | |
|---|---|---|
| *H01G 4/18* | (2006.01) | |
| *H01G 4/08* | (2006.01) | |
| *C08J 5/18* | (2006.01) | |
| *B29C 55/14* | (2006.01) | |
| *B29K 23/00* | (2006.01) | |
| *B29L 31/34* | (2006.01) | |

(52) U.S. Cl.
CPC ................ *H01G 4/08* (2013.01); *B29C 55/143* (2013.01); *C08J 5/18* (2013.01); *H01G 4/18* (2013.01); *B29K 2023/10* (2013.01); *B29L 2031/3406* (2013.01); *C08J 2323/12* (2013.01); *Y02T 10/7022* (2013.01); *Y10T 428/24479* (2015.01); *Y10T 428/24529* (2015.01); *Y10T 428/24545* (2015.01)

(58) Field of Classification Search
USPC ........... 361/323, 301.1–301.5, 303, 304, 305, 361/311–313, 316, 319, 518–512
See application file for complete search history.

(56) References Cited

U.S. PATENT DOCUMENTS

| | | | |
|---|---|---|---|
| 4,138,520 A | 2/1979 | Sato et al. | |
| 4,916,198 A | 4/1990 | Scheve et al. | |
| 5,905,628 A * | 5/1999 | Okuno et al. ................ | 361/303 |
| 6,370,008 B1 * | 4/2002 | Vetter ............................ | 361/273 |
| 6,687,115 B2 * | 2/2004 | Carter .......................... | 361/323 |
| 7,027,286 B2 * | 4/2006 | Shiota et al. .................. | 361/303 |
| 7,405,920 B2 * | 7/2008 | Uematsu et al. .............. | 361/303 |
| 7,724,495 B2 * | 5/2010 | Fuhrmann et al. ......... | 361/301.5 |
| 8,139,341 B2 * | 3/2012 | Kato et al. .................. | 361/301.4 |
| 2008/0102247 A1 | 5/2008 | Matsuo et al. | |

FOREIGN PATENT DOCUMENTS

| | | |
|---|---|---|
| CN | 1256998 A | 6/2000 |
| CN | 101172392 A | 5/2008 |
| JP | 51-63500 | 6/1976 |
| JP | 62-121704 | 6/1987 |
| JP | 2869606 B | 1/1999 |
| JP | 11-147962 | 6/1999 |
| JP | 2001-002805 A | 1/2001 |
| JP | 2001-72778 | 3/2001 |
| JP | 2001-129944 | 5/2001 |
| JP | 2001-324607 | 11/2001 |
| JP | 2002-154187 A | 5/2002 |
| JP | 2002-275287 | 9/2002 |
| JP | 3508515 | 1/2004 |
| JP | 2006-095954 | 4/2006 |
| JP | 2007-246898 | 9/2007 |
| JP | 2007-290380 | 11/2007 |
| JP | 2007-308604 | 11/2007 |
| JP | 2008-133446 | 6/2008 |
| JP | 2011-122142 | 6/2011 |
| JP | 2011-122143 | 6/2011 |

OTHER PUBLICATIONS

Chinese Office Action dated Jan. 28, 2015.
European Search Report dated Feb. 9, 2015 in corresponding Application No. 12754628.1.
M. Fujiyama et al., "Study on Rough-Surface Biaxially Oriented Polypropylene Film I. Formulation of β-Form Crystals in Sheet Cast with T-Die Extruder," *Journal of Applied Polymer Science*, 1988, vol. 36, cover and pp. 985-1048.
Koubunshi Bunseki Handbook (Handbook of Polymer Analysis), new issue, edited by *The Japan Society for Analytical Chemistry, Research Society of Polymer Analysis*, 1995, pp. 609-611 along with two pages of partial English translation.

* cited by examiner

*Primary Examiner* — Nguyen T Ha
(74) *Attorney, Agent, or Firm* — DLA Piper LLP (US)

(57) ABSTRACT

A biaxially stretched polypropylene film includes protrusions on both surfaces, in which the biaxially stretched polypropylene film has a thickness t1 of 1 μm to 3 μm, has a tensile strength in the machine direction of 120 MPa to 250 MPa, has a tensile strength in the transverse direction of 250 MPa to 400 MPa, has a minimum protrusion height $P_{min}$ of 100 nm or greater and a maximum protrusion height $P_{max}$ of 1,600 nm or smaller for either surface, and satisfies all of Formulae (1) to (3) when one of the surfaces is surface A and the other is surface B: $0.5 \leq Pa_{250\text{-}450}/Pa \leq 1.0$ (1), $0.5 \leq Pb_{450\text{-}1600}/Pb \leq 1.0$ (2), and $600 \leq Pa+Pb \leq 1{,}200$ (3).

10 Claims, No Drawings

BIAXIALLY STRETCHED POLYPROPYLENE FILM, METALLIZED FILM AND FILM CAPACITOR

TECHNICAL FIELD

This disclosure relates to a biaxially stretched polypropylene film suitable for packaging, industrial uses, and the like. The disclosure specifically relates to a biaxially stretched polypropylene film with high dielectric strength and processability into an element suitable as a dielectric for capacitors, and to a metallized film and a film capacitor derived from the biaxially stretched polypropylene film.

BACKGROUND

Biaxially stretched polypropylene films are excellent in transparency, mechanical properties, electrical properties, and the like and therefore have many applications such as packaging, tapes, and electrical uses including cable wrapping and capacitors.

As for capacitor applications, the films are particularly preferably used in high-voltage capacitors for direct current use and for alternating current use because of their excellent dielectric strength properties and low-loss properties.

Recently, various types of electric equipment have been incorporating inverters, and along with this trend, demands have been growing for capacitors smaller in size and enhanced in capacitance. Because of these demands from the market, in particular from automobile applications (including a hybrid car application), a biaxially stretched polypropylene film that is thinner and is also improved in dielectric strength and processability into an element is essential.

From the viewpoints of dielectric strength and processability into an element, it is necessary to make the surface of the biaxially stretched polypropylene film moderately rough, which is particularly important in order to improve the smoothness and oil impregnation of the film or to ensure the protective properties of a metallized capacitor. The protective properties herein mean a function, of a metallized capacitor the electrode of which is a metallized film formed on such a dielectric film, to allow the deposited metal to scatter at the time of overdischarge due to discharge energy so as to recover insulation and to prevent a short circuit, thereby maintaining the functions of the capacitor or preventing dielectric breakdown of the capacitor. The protective properties are also an extremely useful function from the safety viewpoint.

As a method of achieving a rough surface, mechanical methods such as embossing and sandblasting, chemical methods such as chemical etching with a solvent, a method of stretching a sheet containing polymers of different species such as polyethylene, a method of stretching a sheet in which β crystals have formed (see Japanese Patent Application Laid-open Nos. 51-63500 and 2001-324607, for example), and the like are conventionally suggested.

However, these may not necessarily be adequate in terms of roughness density, irregularly large protrusions, and the number of protrusions because roughness density is low in the mechanical methods and the chemical methods and, in the method of stretching a sheet in which β crystals have formed, irregularly large protrusions readily form. In addition, films with rough surfaces that are formed by these methods tend to cause insufficient oil impregnation between film layers at the time of capacitor fabrication to leave some areas not impregnated, which can impair the lifetime of the capacitor. In the method of stretching a sheet containing polymers of different species such as polyethylene, although capacitor fabrication leaves fewer air bubbles, the polymers of different species can adversely affect at the time of film recycling to impair recyclability.

Besides, the biaxially stretched polypropylene film obtained by any of these methods may not achieve adequate protective properties under stringent conditions with a potential gradient of 350 V/μm or higher where the capacitor is used, which can lower reliability. The potential gradient herein is the voltage applied to a dielectric film, after divided by the thickness of the film, that is, voltage applied per unit film thickness.

On the other hand, in terms of roughness density and uniform protrusions, a polypropylene film with high melt tension (see Japanese Patent Application Laid-open No. 2001-72778, for example), a film in which a polypropylene film with high melt tension and a usual polypropylene film are stacked (see Japanese Patent Application Laid-open No. 2001-129944, for example), and the like are suggested. When a polypropylene resin with high melt tension is used in a capacitor, however, heat resistance and pressure resistance cannot be adequate due to the resin structure and therefore dielectric breakdown voltage significantly decreases in particular at high temperatures. In addition, by the technique of stacking a polypropylene resin with high melt tension, especially in the case of a thin film having a film thickness of 5 μm or smaller, it is very difficult to achieve a stacked structure with uniform thickness, and the fact of the matter is that the dielectric film to be obtained is poor in uniformity and therefore cannot be satisfactory in practical use.

Japanese Patent No. 3508515 discloses a biaxially stretched polypropylene film in which the degree of surface roughness is controlled and a method for fabricating the same. However, this method is inadequate and is less prone to roughen both surfaces of the film finely and to control the protrusion height for both surfaces of the film.

Japanese Patent Application Laid-open Nos. 2007-308604 and 2008-133446 where roughness is specified for at least one surface of the film claim that a finely roughened surface formed by specifying the β crystal fraction of a cast raw sheet to be within a certain range can have windability into an element and pressure resistance in balance. This fabrication method, however, cannot adequately control the degree of surface roughness for both surfaces of the film, and the finely roughened surface of the resulting film is yet to satisfy requirements for pressure resistance and processability into an element particularly in automobile applications.

SUMMARY

We provide a biaxially stretched polypropylene film, a metallized film, and a film capacitor that have excellent dielectric strength and reliability in a high voltage capacitor and ensure consistent processability into an element.

The biaxially stretched polypropylene film includes protrusions on both surfaces, the biaxially stretched polypropylene film having a thickness t1 of 1 μm to 3 μm, a tensile strength in a machine direction of 120 MPa to 250 MPa, a tensile strength in a transverse direction of 250 MPa to 400 MPa, a minimum protrusion height $P_{min}$ of 100 nm or greater and a maximum protrusion height $P_{max}$ of 1,600 nm or smaller for either surface, and satisfying all of Formulae (1) to (3) when one of the surfaces is surface A and the other is surface B:

$$0.5 \leq Pa_{250\text{-}450}/Pa \leq 1.0 \tag{1}$$

$$0.5 \leq Pb_{450\text{-}1600}/Pb \leq 1.0 \tag{2}$$

$$600 \leq Pa + Pb \leq 1{,}200 \tag{3}$$

in Formulae (1) to (3), $Pa_{250-450}$ is number of protrusions with a height of not smaller than 250 nm and smaller than 450 nm per 0.1 mm² on surface A, $Pb_{450-1600}$ is number of protrusions with a height of not smaller than 450 nm and smaller than 1600 nm per 0.1 mm² on surface B, Pa is number of protrusions per 0.1 mm² on surface A, and Pb is number of protrusions per 0.1 mm² on surface B.

Moreover, in the above-described biaxially stretched polypropylene film, Pa and Pb satisfy Formula (4):

$$|Pa-Pb| \geq 100 \quad (4).$$

Moreover, in the above-described biaxially stretched polypropylene film, ten-point average roughness (SRz) is not lower than 500 nm and not higher than 1,500 nm for either surface.

Moreover, in the above-described biaxially stretched polypropylene film, center line surface roughness (SRa) is not lower than 20 nm and not higher than 50 nm for either surface.

Moreover, in the above-described biaxially stretched polypropylene film, a value of a ratio SRz/SRa of center line surface roughness (SRa) to ten-point average roughness (SRz) is not lower than 20 and not higher than 40 for either surface.

Moreover, in the above-described biaxially stretched polypropylene film, the biaxially stretched polypropylene film contains 0.05% by mass to 10% by mass of a branched polypropylene.

Moreover, a metallized film is produced by providing a metal film to at least one surface of either one of the above-described biaxially stretched polypropylene film.

Moreover, in the above-described metallized film, the metal film is provided to both surfaces of the biaxially stretched polypropylene film.

Moreover, in the above-described metallized film, a surface electrical resistance of the metal film is within the range of 1Ω/□ to 20Ω/□.

Moreover, a film capacitor is formed of the above-described metallized film.

We thus provide a biaxially stretched polypropylene film that is suitable to be used in a capacitor and the like, has excellently uniform surface protrusions, is high in roughness density, and combines a surface with a small number of irregularly large protrusions and a surface with a great number of irregularly large protrusions that are uniformly scattered.

The biaxially stretched polypropylene film is excellent in surface properties, excellent in processing suitability even as a thin film, and has high dielectric strength under conditions at ambient temperature of a wide range, that is, from a low temperature (−40° C.) to a high temperature (115° C.), and therefore can be suitably used in a capacitor in particular, and preferably in a film capacitor for an automobile.

DETAILED DESCRIPTION

Our biaxially stretched polypropylene film, our metallized film derived from the biaxially stretched polypropylene film, and our film capacitor will be explained in detail.

The biaxially stretched polypropylene film has protrusions on both surfaces and has a thickness t1 of 1 μm to 3 μm. The thickness is a thickness measured by a micrometer method, which is to be explained.

The tensile strength of the biaxially stretched polypropylene film is 120 MPa to 250 MPa in the machine direction and is 250 MPa to 400 MPa in the transverse direction.

The biaxially stretched polypropylene film is characterized by having a minimum protrusion height $P_{min}$ of 100 nm or greater and a maximum protrusion height $P_{max}$ of 1,600 nm or smaller for either surface, and satisfying all of Formulae (1) to (3) with one of the surfaces being surface A and the other being surface B:

$$0.5 \leq Pa_{250-450}/Pa \leq 1.0 \quad (1)$$

$$0.5 \leq Pb_{450-1600}/Pb \leq 1.0 \quad (2)$$

$$600 \leq Pa+Pb \leq 1,200 \quad (3)$$

in Formulae (1) to (3), $Pa_{250-450}$ is the number of protrusions with a height of not smaller than 250 nm and smaller than 450 nm per 0.1 mm² on surface A, $Pb_{450-1600}$ is the number of protrusions with a height of not smaller than 450 nm and smaller than 1600 nm per 0.1 mm² on surface B, Pa is the number of protrusions per 0.1 mm² on surface A, and Pb is the number of protrusions per 0.1 mm² on surface B.

As described above, the biaxially stretched polypropylene film preferably has a film thickness measured by a micrometer method of 1 μm to 3 μm in terms of the size of a capacitor element and consistent film formation. The film thickness measured by a micrometer method is more preferably 1.2 μm to 2.8 μm and is particularly preferably 1.5 μm to 2.5 μm. When the film is too thin, mechanical strength or dielectric breakdown strength can decrease. When the film is too thick, a uniform film thickness is hard to achieve and a dielectric for a capacitor derived from the film has small capacitance per volume.

The biaxially stretched polypropylene film preferably has a tensile strength in the machine direction of 120 MPa to 250 MPa and a tensile strength (MPa) in the transverse direction of 250 MPa to 400 MPa. When the tensile strength is too low, the film tends to break at the time of winding, the dielectric strength of the film tends to decrease, and the pressure resistance of the film tends to decrease. When the tensile strength is too high, the dielectric strength of the film is high and Joule heat generated at the time of film breaking is high, which cause the film to fuse to each other, making it difficult to maintain protective properties.

The biaxially stretched polypropylene film preferably has a minimum protrusion height $P_{min}$ of 100 nm or greater for either surface. When the minimum protrusion height $P_{min}$ is smaller than 100 nm, the film tends to undergo insufficient air removal under conventional winding conditions to lead to improper winding of the film, and tends to be unstable while transferred in an evaporation step, a slit step, and a step of winding into a capacitor element, which results in phenomena such as jetting and wandering and also in scratches, thereby yielding a defect. This facilitates wrinkle formation particularly during the step of winding into a capacitor element, which causes local adherence between layers to generate electric field concentration that reduces pressure resistance.

The biaxially stretched polypropylene film preferably has a maximum protrusion height $P_{max}$ of 1,600 nm or smaller for either surface. When the maximum protrusion height $P_{max}$ exceeds 1,600 nm, the irregularly large protrusions significantly facilitate a decrease in dielectric breakdown voltage and the minimum thickness of the film is small, which tend to reduce pressure resistance.

The biaxially stretched polypropylene film satisfies Formulae (1) to (3) with one of the surfaces being surface A and the other being surface B:

$$0.5 \leq Pa_{250-450}/Pa \leq 1.0 \quad (1)$$

$$0.5 \leq Pb_{450-1600}/Pb \leq 1.0 \quad (2)$$

$$600 \leq Pa+Pb \leq 1,200 \quad (3)$$

in Formulae (1) to (3), $Pa_{250-450}$ is the number of protrusions with a height of not smaller than 250 nm and smaller than 450 nm per 0.1 mm² on surface A, $Pb_{450-1600}$ is the number of protrusions with a height of not smaller than 450 nm and smaller than 1600 nm per 0.1 mm² on surface B, Pa is the number of protrusions per 0.1 mm² on surface A, and Pb is the number of protrusions per 0.1 mm² on surface B.

In Formulae (1) to (3), when the value of $Pa_{250-450}/Pa$ of one surface is smaller than 0.5, the film tends to undergo insufficient air removal to lead to improper winding of the film, is vulnerable to scratches while transferred in the evaporation step, the slit step, and the step of winding into a capacitor element, thereby yielding a defect, and is vulnerable to jetting during transfer to lead to poor processability. Particularly in the step of winding into a capacitor element, wrinkles tend to form, space between layers is narrow enough to cause local adherence between layers to generate electric field concentration that reduces pressure resistance, and an element end face tends to be irregular, resulting in degradation in electrical properties such as dielectric loss tangent. When $Pb_{450-1600}/Pb$ of the other surface is smaller than 0.5, the space between film layers can be insufficient for self healing of the capacitor, which makes protective properties difficult to ensure, or the space between film layers can be too large, which makes dielectric strength less likely to be adequate. Particularly in applications where reliability is important and therefore it is important to ensure protective properties, space between film layers is very important in order to keep the balance between self healing properties and dielectric strength.

The biaxially stretched polypropylene film preferably satisfies Formula (5):

$$600 \leq Pa+Pb \leq 1,200 \tag{5}$$

in Formula (5), the value of Pa+Pb is preferably 700 to 1,100. When the total number of protrusions on both surfaces is too small, a smooth area spreads to make up a great proportion per area of the film base surface, and therefore the space between film layers tends to be locally narrow, which makes the protective properties of the capacitor difficult to maintain and to ensure. When the number of protrusions is too large, dielectric breakdown tends to occur at protrusions.

Pa and Pb preferably satisfy Formula (4):

$$|Pa-Pb| \geq 100 \tag{4}$$

The value of |Pa−Pb| is preferably 200 or larger and is further preferably 250 or larger. The value that is 100 or larger can achieve sufficient space between film layers, excellent self healing, and protective properties in applications where the protective properties and the reliability of the capacitor are important.

A technological background of film capacitors to which the biaxially stretched polypropylene film is mainly applied will be explained. To make the dielectric strength and the processability into an element of a biaxially stretched polypropylene film excellent, control of the surface roughness, the protrusion height, and the number of protrusions on both surfaces of the biaxially stretched polypropylene film is important. For excellent dielectric strength and processability into a capacitor element, uniform space between film layers and easy sliding of the film against each other or against a transfer roller are also important and. Therefore. a reduction of local adherence between film layers in an element and of residual stress is demanded. In this respect, we adopt an indicator that cannot be indicated by conventional two-dimensional or three-dimensional center line surface roughness. By controlling a protrusion with a height of not smaller than 250 nm and smaller than 450 nm on one surface and a protrusion with a height of not smaller than 450 nm and smaller than 1,600 nm on the other surface, suitable processability into an element, high dielectric strength, and protective properties can be achieved.

The biaxially stretched polypropylene film preferably has ten-point average roughness (SRz) of 500 nm or higher for both surfaces. When SRz is lower than 500 nm, the film can undergo insufficient air removal or the like to lead to improper winding of the film, which results in a disordered roll shape, whereby the slit step and capacitor element formation fail to work properly. On the other hand, SRz that exceeds 1,500 nm potentially leads to a decrease in dielectric breakdown voltage and, therefore, preferable SRz is 500 nm to 1,500 nm. SRz is more preferably 600 nm to 1,400 nm and is particularly preferably 700 nm to 1,300 nm so as to improve winding properties in the slit step and a step of winding into a capacitor element and then to obtain a film with excellent processability.

The biaxially stretched polypropylene film preferably has center line average roughness (SRa) of 50 nm or lower for both surfaces. When the center line average roughness (SRa) is higher than 50 nm, air tends to enter between layers during stacking of the films, which can deteriorate the capacitor element. In addition, at the time of forming a metal layer on the film, the metal layer tends to be perforated or the like to reduce dielectric breakdown strength at high temperatures and an element lifetime, or at the time of voltage application, charges tend to concentrate to cause an insulation defect. In contrast, when SRa is lower than 20 nm, film sliding can degrade to cause poor handling, or, in cases where the capacitor element is impregnated with insulating oil, the insulating oil may not penetrate in a uniform fashion between the film layers, which increases change in capacitance in continuous use. Because of these, the center line average surface roughness (SRa) is preferably 20 nm to 50 nm, is particularly preferably 25 nm to 45 nm, and is further preferably 30 nm to 40 nm for both surfaces of the film. In this way, winding properties in the step of winding into a capacitor element, change in capacitance of the capacitor, and protective properties are further improved, and therefore the film to be obtained can have excellent processability and capacitor characteristics.

The biaxially stretched polypropylene film preferably has a certain ratio of the ten-point average roughness (SRz) to the center line average surface roughness (SRa). That is, the value of the ratio of SRz to SRa (SRz/SRa) for each surface is preferably 20 to 40, further preferably 22 to 32, and particularly preferably 25 to 29.

When the value of the ratio (SRz/SRa) is too high, the proportion of irregularly large protrusions increases and therefore air tends to enter between layers during stacking of the films, which can deteriorate the capacitor element. In addition, at the time of forming a metal layer on the film, the metal layer tends to be perforated or the like to reduce dielectric breakdown strength at high temperatures and an element lifetime, or at the time of voltage application, charges tend to concentrate to cause an insulation defect. In contrast, when the ratio (SRz/SRa) is too low, handling and stability during transfer of the film can be poor.

As described above, the biaxially stretched polypropylene film having the surface protrusion as specified above has a surface protrusion height that is excellently uniform and different distributions of protrusion for each surface of the film. The capacitor fabricated using the biaxially stretched polypropylene film has space between film layers sufficient for metal deposited by evaporation to scatter at the time of dielectric breakdown and, therefore, achieves excellent self healing (self recovery process) that leads to a long capacitor lifetime without causing dielectric breakdown of the capacitor and exhibits consistent protective properties, thereby being excellent in safety.

The values of the protrusion height, the number of protrusions, SRz, SRa, and the like can be determined according to JIS B-0601 (1982) using a "non-contact three-dimensional microfigure measuring instrument (ET-30HK)" and a "three-dimensional roughness analyzer (MODEL SPA-11)" manufactured by Kosaka Laboratory Ltd. The details of measurement conditions and the like are to be explained.

The biaxially stretched polypropylene film preferably contains 0.05% by mass to 10% by mass of a branched polypropylene. The branched polypropylene herein is a polypropylene that contains not more than five 3-internally-substituted olefins relative to 10,000 carbon atoms that constitute the branched polypropylene. The presence of the 3-internally-substituted olefins can be confirmed from a proton ratio derived from a $^1$H-NMR spectrum.

By using 0.05% by mass to 10% by mass of a branched polypropylene, spherulites generated in a step of cooling a melt-extruded resin sheet can be controlled small in size more easily, the extent of insulation defects that occur in a stretching step can be kept small, and a polypropylene film excellent in dielectric strength can be obtained. The branched polypropylene acts like an α-crystal nucleating agent, and also can form a rough surface through crystal modification when added at an amount within a certain range. By this as well as by reducing the spherulite size as described above, a crater-like shape, which is to be explained, consisting of a number of protrusions can form small in size and densely, and therefore a biaxially stretched polypropylene film having excellent and characteristic surface roughness with excellently uniform protrusions and devoid of irregularly large protrusions can be obtained. The content of the branched polypropylene is more preferably 0.05% by mass to 2% by mass. When the content of the branched polypropylene is within this range, a film that has improved winding properties and dielectric strength and is excellent in processability into an element and capacitor characteristics can be obtained.

A method of forming the biaxially stretched polypropylene film will be explained.

From the viewpoints of adding no electrical impurity and reducing chances to deteriorate electrical properties such as dielectric breakdown voltage, a typical method that can be adopted is a technique that utilizes crystal modification to achieve desired protrusions and surface roughness.

Surface morphology derived from crystal modification will be explained. A method of surface formation through crystal modification as described in, for example, M. Fujiyama, Journal of Applied Polymer Science 36, P. 985-1048 (1988) and the like utilizes two crystal systems of a polypropylene to form a surface. In this method, a spherulite with an α crystal (monoclinic system, crystal density of 0.936 g/cm$^2$) system and a spherulite with a β crystal (hexagonal system, crystal density of 0.922 g/cm$^2$) system are generated on a non-stretched sheet and then, in a stretching step, crystal modification from the thermally unstable β crystals into α crystals is performed to form irregularities on the film surface. The surface irregularities obtained by this technique has its base unit derived from spherulite deformation and, therefore, can assume the shape of an elliptical or arc-like crater consisting of a number of protrusions. The surface morphology obtained by the crystal modification can be formed to include many of these craters, where each crater can be an elliptical or arc-like strand of protrusions.

This technique characteristically forms no irregularities in the area devoid of spherulites of β crystal system and therefore makes that area relatively smooth. The crater-like shape consisted of protrusions changes corresponding to the length-width stretch ratio of biaxially stretching. When the length-width ratio is 1, that is, in isotropic stretching, the shape is almost circular, and as the length-width ratio increases, the shape becomes flattened. Morphology that is usually derived from sequential biaxial stretching has its major axis in the transverse direction of the film (the transverse direction of a film roll). Depending on how the spherulites form, a plurality of craters with different shapes can lie one on top of another, or the arc can assume an arcuate or half arc-like shape without closing to form a circle.

One of the techniques that can be adopted to achieve surface morphology having Pa and Pb as specified above is a method of adding a raw material that has an effect as a nucleating agent to enhance nucleus-forming capability. This can increase the number of nuclei to form many small fine protrusions, thereby reducing the size of relatively smooth area (area devoid of protrusions) and therefore achieving surface morphology across which protrusions form uniformly. Such a surface has densely formed protrusions and therefore tends to satisfy the surface morphology specified above.

As the raw material that has an effect as a nucleating agent, the branched polypropylenes described above are exemplified. Selecting the addition amount of the branched polypropylene and conditions in film formation can control the crater-like shape and, therefore, can achieve the characteristic surface morphology mentioned above of the biaxially stretched polypropylene film.

The biaxially stretched polypropylene film preferably contains a mixture of the branched polypropylene and a linear polypropylene. This can achieve a melt crystallization temperature of 115° C. or higher, while that of an ordinal polypropylene is about 110° C. Because the high melt crystallization temperature facilitates recovery of protective properties during self healing (self recovery process) of the capacitor, dielectric strength improves and dielectric breakdown is avoided. That is, when dielectric breakdown of the dielectric film somehow occurs, the discharge energy causes scattering of the metal deposited by evaporation in the vicinity of the discharge area and then locally increases the temperature, causing the film to partly melt, but the high melt crystallization temperature allows rapid recrystallization and facilitates recovery of insulating properties. When ambient temperature around the capacitor is high, recrystallization is usually less prone to occur and insulating properties are less prone to recover, but the high melt crystallization temperature can facilitate recrystallization at high temperatures at the time of dielectric breakdown and therefore can improve protective properties. By controlling surface roughness by, for example, forming a rough surface to create gaps between film layers, insulating properties recover well and dielectric strength improves even better.

The branched polypropylene is not particularly limited, and is preferably one that has melt tension of 1 cN to 30 cN and is more preferably one that has melt tension of 2 cN to 20 cN from the viewpoint of film-forming properties. The higher the melt tension is, the more uniform the protrusion height tends to be, which then decreases the ratio (SRz/SRa) and, therefore, the surface tends to be denser (the number of protrusions per unit area tends to increase). The protrusion height is less uniform when the melt tension is smaller than 1 cN, while when the melt tension is 30 cN or greater, the protrusion height cannot be suitable.

The branched polypropylene is preferably obtained by a method of mixing oligomers and/or polymers having branched structures, a method of introducing a long-chain branched structure into a polypropylene molecule as described in Japanese Patent Application Laid-open No. 62-121704, a method described in Japanese Patent No. 2869606, or the like. Specific examples of available branched polypropylenes include "Profax PF-814" manufactured by Basell and "Daploy HMS-PP" manufactured by Borealis, and a resin obtained by electron beam crosslinking is particularly preferably used because the resin contains less gel components. When the branched polypropylene is added to a usual linear polypropylene (PP), the melt crystallization temperature of PP characteristically increases from its usual value of 110° C. to a range of 115° C. to 130° C.

When the branched polypropylene is added to a usual linear polypropylene, the content of the branched polypropylene in the entire film is preferably up to 10% by mass, is more preferably 0.05% by mass to 2% by mass, and is further preferably 0.05% by mass to 1% by mass. Due to this resin composition, the biaxially stretched polypropylene film has at least two melting peak temperatures to be observed, that is, a first melting peak temperature of 160° C. to 172° C. and a shoulder peak temperature of 148° C. to 157° C. are observed as melting peaks in 2nd-Run measurement. This makes it possible to obtain a film that assumes dense surface morphology having uniform protrusions and a smaller number of irregularly large protrusions. This content also makes it possible to produce a biaxially stretched polypropylene film that assumes excellent surface morphology having excellently uniform protrusions and having a small number of irregularly large protrusions and that has excellent processability and high dielectric strength even under conditions at ambient temperature of a wide range, that is, of −40° C. to 115° C. or higher.

Next, the linear polypropylene that is the main component of the biaxially stretched polypropylene film will be explained.

The linear polypropylene is one that is ordinarily used in packaging material and in capacitors, and preferably has not higher than 4% by mass of a cold xylene soluble fraction (hereinafter, CXS). The cold xylene soluble fraction (CXS) is a polypropylene component dissolved in xylene after completely dissolving a sample in heated xylene, cooling the resultant to room temperature, and then filtering off the undissolved matter precipitated on cooling, and is a component less prone to crystallization presumably because of its low tacticity, low molecular weight, and the like. A film derived from a resin containing a great proportion of this component may have poor dimensional stability on heating, low dielectric breakdown voltage at high temperatures, or a similar problem. Therefore, the CXS content is preferably not higher than 4% by mass, is further preferably not higher than 3% by mass, and is particularly preferably not higher than 2% by mass. This range is preferably satisfied for the linear polypropylene used, and is also preferably satisfied for the entire film containing the polymer.

A polymer or a polypropylene film containing CXS in such a proportion can be produced by a method of enhancing catalytic activity during polymer production, a method of washing a polymer product with a solvent such as n-heptane or a propylene monomer itself, and the like. From the same viewpoint, the mesopentad fraction of the linear polypropylene is preferably 0.95 or higher and further preferably 0.97 or higher. The mesopentad fraction is an indicator of the tacticity of a polypropylene in a crystalline phase measured by nuclear magnetic resonance (NMR), and the numerical value thereof is preferably high so as to obtain a high degree of crystallinity, a high melting point, and high dielectric breakdown voltage at high temperatures. The upper limit to the mesopentad fraction is not particularly specified. Examples of a method of obtaining a polymer with such high tacticity include a method of washing a resin powder with a solvent such as n-heptane, as described above.

The melt flow index (melt flow rate: MFR) of the linear polypropylene is more preferably 1 g/10 minutes to 10 g/10 minutes (230° C., load: 21.18 N) and particularly preferably 2 g/10 minutes to 5 g/10 minutes (230° C., load: 21.18 N) in terms of film-forming properties. The melt flow index (MFR) is made to fall within that range by, for example, a method of controlling an average molecular weight and/or a molecular weight distribution.

The linear polypropylene is primarily a propylene homopolymer, and may also be, without impairing the purpose of the present invention, a polypropylene copolymer containing another unsaturated hydrocarbon as a copolymer component or be a mixture of a propylene homopolymer and a polypropylene copolymer containing an unsaturated hydrocarbon as a copolymer component. Examples of the monomer component constituting the copolymer component or the mixture include ethylene, propylene (in the case where the mixture is a copolymerization product), 1-butene, 1-pentene, 3-methyl-1-pentene, 3-methyl-1-butene, 1-hexene, 4-methyl-1-pentene, 5-ethyl-1-hexene, 1-octene, 1-decene, 1-dodecene, vinylcyclohexene, styrene, allylbenzene, cyclopentene, norbornene, 5-methyl-2-norbornene, and the like. The formulation amount of the copolymer component is preferably smaller than 1 mol % and the addition amount of the copolymer is preferably smaller than 10% by mass in terms of dielectric breakdown resistance and dimensional stability.

The linear polypropylene can contain various additives such as a nucleating agent, an antioxidant, a heat stabilizer, a lubricant, an antistatic agent, an anti-blocking agent, a filler, a viscosity modifier, an anti-discoloration agent without impairing the desired effect.

Among these, selected species and content of antioxidant can be preferable for long-term heat resistance. That is, the antioxidant is preferably a phenol with steric hindrance, and at least one species of the antioxidant preferably has a high molecular weight of 500 or higher. Specific examples thereof include many of that, and it is preferable to use a combination of 2,6-di-tert-butyl-p-cresol (BHT, molecular weight: 220.4), for example, and 1,3,5-trimethyl-2,4,6-tris(3,5-di-tert-butyl-4-hydroxybenzyl)benzene (Irganox (registered trademark) 1330 manufactured by Ciba-Geigy, molecular weight: 775.2, for example), tetrakis[methylene-3-(3,5-di-tert-butyl-4-hydroxyphenyl)propionate]methane (Irganox 1010 manufactured by Ciba-Geigy, molecular weight: 1,177.7, for example), or the like. The total content of the antioxidant is preferably within the range of 0.03% by mass to 1% by mass relative to the polypropylene as a whole. When the amount of the antioxidant is too small, long-term heat resistance can be poor, while too much antioxidant can cause antioxidant bleed-out that results in blocking at high temperatures to adversely affect the capacitor element. The content is more preferably 0.1% by mass to 0.9% by mass and is particularly preferably 0.2% by mass to 0.8% by mass.

The nucleating agent can be added without impairing the desired effect. Although the branched polypropylene itself acts like an α- or β-crystal nucleating agent as described above, it is still preferable to add another α-crystal nucleating agent (dibenzylidene sorbitols, sodium benzoate, and the like), another β-crystal nucleating agent (potassium 1,2-hydroxystearate, magnesium benzoate, an amide compound such as N,N'-dicyclohexyl-2,6-naphthalenedicarboxamide, a quinacridone compound, and so forth), and the like. However, addition of the nucleating agent may make it difficult to achieve desired surface roughness or may adversely affect electrical properties by, for example, reducing volume resistivity at high temperatures. Therefore, a preferable content thereof is lower than 0.1% by mass and a further preferable content thereof is practically zero.

The surface glossiness of the biaxially stretched polypropylene film is preferably 100% to 130% and more preferably 110% to 120%. Low glossiness means high density of light scattering on the film surface, that is, a densely irregular film surface, in other words, a high number of protrusions per unit area and high roughness density. When the glossiness is lower than 100%, although liquid impregnates well, the larger number of protrusions due to densely formed protrusions makes more air be trapped between protrusions, which facilitates sliding of the film layers against each other to lead to poor windability into an element, making it difficult to wind the film into a roll. In contrast, when the glossiness exceeds 130%, problems arise including one that the film layers are less prone to slide against each other and therefore it is difficult to form them into an elliptical capacitor element and one that clearance between the film layers is insufficient and therefore protective properties degrade. The glossiness is more preferably 110% to 120% for excellent windability into an element, pressure resistance, and protective properties.

The ash content (measured in conformance with JIS-C2330 (1995) 6.3.5) of the biaxially stretched polypropylene film is preferably 50 ppm or lower (by weight, the same applies hereinafter), is more preferably 30 ppm or lower, and is particularly preferably 20 ppm or lower. When the ash content is too high, the dielectric breakdown resistance of the film can decrease to make the dielectric breakdown strength of the resultant capacitor low. To make the ash content fall within the range, it is important to use a raw material containing less catalyst residues. Alternatively, a method of allowing as low contamination from an extrusion system during film formation as possible by, for example, carrying out bleeding for 1 hour or longer and then thoroughly washing the path with a polymer before actually starting film formation can be adopted, for example.

The biaxially stretched polypropylene film can be preferably used as a dielectric film for a capacitor, and the type of the capacitor is not limited. Specifically, the biaxially stretched polypropylene film may be used in a film/foil capacitor or a metallized film capacitor from the viewpoint of the electrode structure, or may be preferably used in an oil-impregnated capacitor that is impregnated with insulating oil and a dry-type capacitor devoid of insulating oil. From the viewpoint of the configuration, either of a wound-type one and a multilayer one is acceptable. In terms of the properties of the film, a metallized film capacitor is particularly preferable.

A polypropylene film is usually low in surface energy, and therefore it is hard to stably deposit metal on it by evaporation. Therefore, the biaxially stretched polypropylene film is preferably subjected to surface treatment beforehand to achieve excellent metal adherence. As the surface treatment, corona discharge treatment, plasma treatment, glow treatment, flame treatment, and the like are specifically exemplified. The surface wetting tension (measured in conformance with JIS K-6768 (1995)) of a polypropylene film is usually about 30 mN/m. The surface treatment achieves wetting tension of 37 to 50 mN/m and preferably of about 39 to 48 mN/m for excellent adherence to a metal film and for excellent protective properties, which is preferable.

The biaxially stretched polypropylene film is obtained by using a raw material capable of providing the properties described above, through biaxially stretching under certain conditions. A method of biaxially stretching can be any of blown simultaneous biaxial stretching, stenter simultaneous biaxial stretching, and stenter sequential biaxial stretching, and, among these, stenter sequential biaxial stretching is preferably adopted in terms of consistent film formation, uniform thickness, and capability of controlling film surface morphology.

A method for producing the biaxially stretched polypropylene film by stenter sequential biaxial stretching will be explained below with no limitation.

First, the linear polypropylene resin is mixed with the branched polypropylene in a certain proportion, followed by melt extrusion. The resultant is passed through a filter, and is then extruded through a slit-shaped nozzle at a temperature of 220° C. to 280° C., followed by solidification on a cooling drum to obtain a non-stretched film.

A method of achieving adherence to the cooling drum may be any of electrostatic application, adherence utilizing surface tension of water, an air-knife method, a press roll method, a casting-in-water method, and the like, and the air-knife method is preferable for its capability of achieving excellent flatness and of controlling surface roughness.

To control protrusions on the film surface, controlling of surface roughness by the air-knife method is exemplified as related art. The air-knife method can control protrusion distribution to some extent. However, the temperature range of air knife is from room temperature to 120° C., and by making the non-stretched film adhere to the cooling drum by means of spraying air at a temperature within that range, a polypropylene film both surfaces of which have the protrusion distribution is less likely to be obtained.

To achieve desired protrusion height and desired protrusion distribution for both surfaces of the biaxially stretched polypropylene film, it is important to make the non-stretched sheet adhere to the cooling drum by air knife at a certain temperature and also to control the peripheral speed of the cooling drum so as to control temperature-maintaining duration for the drum side and for the non-drum side, in order to control the yield and the size of β crystals on both surfaces of the film. The temperature-maintaining duration is the duration during which the non-stretched film is in contact with the cooling drum.

The temperature-maintaining duration for both surfaces of the film can be selected to control the yield of β crystals on the film surface and the protrusion height. The surface in contact with the cooling drum is maintained at a temperature that facilitates β crystal formation and, therefore, the yield of β crystals is high and the size of β crystals is small. Temperature is maintained at a range that facilitates β crystal formation with the heat of the cooling drum being transferred across the film. Therefore, for the surface that is not in contact with the cooling drum, the temperature-maintaining duration during which β crystal formation is facilitated is shorter than that for the surface in contact with the cooling roll, resulting in a lower yield of β crystals, greater protrusion height, and a larger fibril size.

To form β crystals efficiently, the resin is preferably maintained for a certain period of time at a temperature at which the efficiency of β crystal formation is maximum, and the temperature range of the cooling drum is preferably 70° C. to 135° C., is further preferably 80° C. to 120° C., and is particularly preferably 85° C. to 110° C. The temperature-maintaining duration is preferably 1.5 seconds or longer and is particularly preferably 2.0 seconds or longer.

Then, the non-stretched film is biaxially stretched to achieve biaxial orientation. The non-stretched film is preheated while passing on a roll at 120° C. to 150° C., and then the resultant sheet is passed between rolls of different peripheral speeds at a temperature of 130° C. to 160° C. to achieve stretching by a factor of 4.0 to 5.5 in the machine direction, followed by rapid cooling. During stretching, a radiation heater is preferably provided in the area where stretching takes place to add heat from one surface of the film.

As for the biaxially stretched polypropylene film, to achieve desired protrusion distribution for both surfaces of the film and desired tensile strength, it is important to control the temperature of the cooling drum, to control the temperature-maintaining duration, and to control the stretch ratio while controlling the amount of heat at both film surfaces A and B in the step of stretching in the machine direction. This can easily achieve desired protrusion distribution and tensile strength for both surfaces of the biaxially stretched polypropylene film.

The temperature of the roll in the area where stretching in the machine direction takes place is preferably 130° C. to 160° C. at which $\beta$ crystals in the non-stretched film melt to form protrusions on the film surface. The temperature is further preferably 135° C. to 155° C. and is particularly preferably 140° C. to 150° C. When the temperature of the roll in the area where stretching takes place is too high, the film fuses to the roll to cause the film to break. In contrast, when the temperature of the roll is too low, stretching can be nonuniform or $\beta$ crystals cannot melt, resulting in no protrusion formation on the film surface.

Heating with a radiation heater in the area where stretching takes place is heating with no film contact, that is different from heating from the roll with the surfaces being in contact and, therefore, can directly control formation of surface protrusions with high accuracy. Thus, conventional heating of the film from a roll combined with the controlled noncontact heating achieved predetermined protrusion distribution on both surfaces of the biaxially stretched polypropylene film. The power of the radiation heater is preferably 1.5 kW to 13 kW at which $\beta$ crystals melt to form protrusions on the film surface in the same manner as in heating from the roll. The power of the radiation heater is further preferably 2 kW to 11 kW and is particularly preferably 2.5 kW to 10.5 kW. When the power of the radiation heater is too high, the film melts to cause the film to break. In contrast, when the power of the radiation heater is too low, the film can break or surface protrusions on the surface heated with the radiation heater can be small so that desired protrusion distribution on the film surface cannot be achieved.

In production of the biaxially stretched polypropylene film, the radiation heater is provided not only in the area where preheating takes place before film stretching, but also in the area where stretching takes place so that the film on stretching can be directly heated without contact and, therefore, surface protrusions can form with high efficiency in the area where heating of the film takes place during stretching, which makes it possible to easily achieve the protrusion distribution on the film surface.

The stretch ratio in the machine direction, or the stretch ratio in the machine direction, of the biaxially stretched polypropylene film is preferably 4.0 to 5.5 to aid melting of $\beta$ crystals. The stretch ratio in the machine direction is further preferably 4.3 to 5.2. Controlling the stretch ratio can control the size of the protrusions because the protrusions on the film surface elongates by stretching. The stretch ratio in the machine direction that is higher than 6 facilitates breaking of the film, which makes film formation difficult to achieve. The stretch ratio that is too low makes the protrusions on the film surface small in size and tensile strength low. The stretch ratio that is lower than 4 makes it difficult to achieve desired tensile strength and reduces dielectric strength.

It is important to rapidly cool the biaxially stretched polypropylene film immediately after stretching in the machine direction to control the protrusion distribution. It is preferable to perform rapid cooling at 30° C. to 50° C. right after stretching in the machine direction at a stretching temperature of 130° C. to 160° C. Rapid cooling at 30° C. to 50° C. can stop melting of $\beta$ crystals to maintain the protrusion distribution on the film surface resulted from stretching. When the cooling temperature is higher than 50° C., the protrusion distribution on the film surface resulted from stretching cannot remain, while when the cooling temperature is lower than 30° C., film solidification proceeds rapidly to make the film brittle and to facilitate collapse of the protrusions, making it difficult to achieve the protrusion distribution on the film surface. A technique of rapid cooling can be use of a cooling roll or rapid cooling by air.

After stretching in the machine direction, the stretched film is transferred to a stenter where the film is stretched by a factor of 5 to 15 in the transverse direction at a temperature of 150° C. to 170° C., and then the resultant is subjected to heat setting at a temperature of 140° C. to 170° C. while relaxed at 2% to 20% in the transverse direction. After heat setting, the stretched film is subjected to corona discharge treatment in the air, in nitrogen, in carbonic acid gas, or in mixed gas of these on the surface to which deposition by evaporation is to be performed to improve adherence of metal to be deposited by evaporation, thereby obtaining the biaxially stretched polypropylene film.

A method of providing a metal film to the surface of the biaxially stretched polypropylene film to obtain a metallized film is not particularly limited, and a preferable one is, for example, a method of depositing aluminum by evaporation on at least one surface, or both surfaces where appropriate, of the biaxially stretched polypropylene film to provide a metal film such as an aluminum-deposited film that is to serve as an internal electrode of the film capacitor. Simultaneously or sequentially with aluminum deposition, another metal component such as nickel, copper, gold, silver, chromium, zinc, or the like can also be deposited by evaporation. To the deposited film, a protective layer of oil or the like can be provided.

The thickness of the metal film is preferably 20 nm to 100 nm in terms of the electrical properties of the film capacitor and self healing. From the same reason, the value of surface electrical resistance of the metal film is preferably 1Ω/□ to 20Ω/□. The value of surface electrical resistance can be controlled by selecting the species of the metal used and the film thickness. The surface electrical resistance is measured by a method to be described.

Following metal film formation, the metallized film can be subjected to aging at a specific temperature or to heat treatment, if necessary. The metallized film can be coated with poly(phenylene oxide) or the like on at least one surface for insulation or another purpose.

The metallized film thus obtained can be stacked or wound by various methods to obtain the film capacitor. A preferable method for fabricating a wound-type film capacitor is exemplified as follows.

The biaxially stretched polypropylene film is subjected to aluminum vacuum evaporation on one surface (evaporation step). Evaporation is performed to form stripes of margins in the machine direction of the film. Then, slits are made (slit step) with a blade on the surface in the center of each deposited area and in the center of each margin to prepare a tape to be wound up that has a margin on one side on the surface. Among the tapes to be wound up with a left margin or a right margin, two of the tapes, one with a left margin and the other with a right margin are overlaid one on another such that the deposited area lies off the edge of the margin in the transverse direction, and then the resultant is wound up to obtain a roll (step of winding into an element). The roll from which a core has been removed is pressed, and then both ends of the resultant are subjected to metallikon thermal spraying to form external electrodes, followed by welding of a lead wire to the metallikon-subjected area to obtain a wound-type film capacitor. A film capacitor has many applications including vehicles, appliances (televisions, refrigerators, and the like), general noise suppression uses, automobiles (hybrid cars, automatic windows, wipers, and the like), power supplies, and the like, and the film capacitor can also be suitably used in these applications.

Methods of measuring the characteristic values of the biaxially stretched polypropylene film and methods for evaluating the effects of the same are as follows.

(1) Film Thickness (μm)

The thickness was measured by a micrometer method in conformance with JIS C-2330 (2001) 7.4.1.1.

(2) Gloss (Glossiness)

Glossiness was determined as the average value of five data obtained in conformance with JIS K-7105 (1981) using a digital variable gloss meter UGV-5D manufactured by Suga Test Instruments Co., Ltd. under conditions of an angle of incidence of 60° and an acceptance angle of 60°.

(3) Melt Flow Rate (MFR)

Measurement was performed in conformance with JIS-K7210 (1999) at a measurement temperature of 230° C. with a load of 21.18 N.

(4) Melt Tension (MS)

Measurement was performed using an MFR measuring device in conformance with JIS-K7210 (1999). Using a melt tension tester manufactured by Toyo Seiki Seisaku-sho, Ltd., a polypropylene to be measured was heated at 230° C., and the melt polypropylene thus obtained was discharged at an extrusion rate of 15 mm/minute to form a strand, which was pulled at a rate of 6.5 m/minute to measure the tension, which was to be used as melt tension.

(5) Melting Point, Melt Crystallization Temperature (° C.)

Measurement was performed using an RDC220 differential scanning calorimeter manufactured by Seiko Instruments Inc. under the following conditions.

<Sample Preparation:>

In an aluminum pan to be used in the measurement, 5 mg of a specimen was sealed. In the case where the film had been subjected to metallization or the like, the metal was removed as needed.

<Measurement>

The film was melted, was recrystallized, and was remelted in steps (a)→(b)→(c) below. The melting point of the resin was determined as the highest melting peak temperature among the melting peaks observed in 2nd Run. Measurement was repeated three times, and the average value was to be used as the melting point.

(a) 1st Run 30° C.→280° C. (temperature raising rate: 20° C./minute)

(b) Tmc Maintained at 280° C. for 5 minutes and then cooled to 30° C. at 20° C./minute (c) 2nd Run 30° C.→280° C. (temperature raising rate: 20° C./minute) (6) Mesopentad fraction (mmmm)

A sample was dissolved in a solvent, and the mesopentad fraction (mmmm) was determined by $^{13}$C-NMR under the following conditions (reference: *Koubunshi Bunseki Handbook* (Handbook of Polymer Analysis), new issue, edited by The Japan Society for Analytical Chemistry•*Koubunshi Bunseki Kenkyu Kondankai* (Research Society of Polymer Analysis), 1995, pp. 609-611).

A. Measurement condition

Device: DRX-500 manufactured by Bruker

Target nucleus: $^{13}$C nucleus (resonance frequency: 125.8 MHz)

Concentration in measurement: 10 wt %

Solvent: benzene/deuterated o-dichlorobenzene, a mixed solution with a mass ratio of 1:3

Temperature in measurement: 130° C.

Spinning speed: 12 Hz

NMR sample tube: 5-mm tube

Pulse width: 45° (4.5 μs)

Pulse interval: 10 seconds

Data point: 64 K

Conversion counts: 10,000 times

Measurement mode: complete decoupling

B. Analysis Condition

Fourier transformation was performed with line broadening factor (LB) set as 1.0 to obtain an mmmm peak of 21.86 ppm. Peak splitting was performed using WINFIT software (manufactured by Bruker). The peak splitting was performed from a peak on the high magnetic field side as described below, and the supplied software was automatically fitted, followed by optimization of peak splitting. The total of peak fractions of mmmm and ss (spinning side-band peak of mmmm) was to be used as the mesopentad fraction (mmmm).

The measurement was repeated five times, and the average value was to be used as the mesopentad fraction.

Peak (a) mrrm (b)(c) rrrm (split into two peaks)

(d) rrrr (e) mrmm+rmrr (f) mmrr (g) mmmr (h) ss (spinning side-band peak of mmmm)

(i) mmmm (j) rmmr (7) Number of 3-Internally-Substituted Olefins (in 10,000 Carbon Atoms)

A sample was dissolved in a solvent, and the number of 3-internally-substituted olefins was determined by $^1$H-NMR under the following conditions.

A. Measurement Condition

Device: ECX400P nuclear magnetic resonance spectrometer manufactured by JEOL Ltd.

Target nucleus: $^1$H nucleus (resonance frequency: 500 MHz)

Concentration in measurement: 2 wt %

Solvent: deuterated o-dichlorobenzene

Temperature in measurement: 120° C.

Pulse width: 45°

Pulse interval: 7 seconds

Conversion counts: 512 times

Measurement mode: non decoupling

B. Analysis Condition

With the chemical shift of o-dichlorobenzene of 7.10 ppm set as a reference and with the signal at 5.0 ppm to 5.2 ppm assigned to a proton of 3-internally-substituted olefin, the proton ratio of 3-internally-substituted olefin was determined from an integrated rate of a broad signal at 0.5 ppm to 2.0 ppm.

(8) Cold Xylene Soluble Fraction (CXS)

In 100 ml of boiling xylene, 0.5 g of a polypropylene film sample was dissolved, and after the resultant was left to cool, recrystallization was performed for 1 hour in a thermostat filled with water at 20° C. The amount of polypropylene component dissolved in the filtrate was determined by liquid chromatography (X (g)). Determination was performed by the Formula below using the precise amount (X0 (g)) of 0.5 g of the sample.

CXS (% by mass)=(X/X0)×100

(9) Center Line Average Roughness (SRa), Ten-Point Average Roughness (SRz)

Measurement was performed in conformance with JIS B-0601 (1982) using a "non-contact three-dimensional microfigure measuring instrument (ET-30HK)" and a "three-dimensional roughness analyzer (MODELSPA-11)" manufactured by Kosaka Laboratory Ltd. The measurement was repeated 10 times in the machine direction, and the average values of center line average roughness (SRa), ten-point average roughness (SRz), the total number of protrusions, and the number of protrusions were obtained, followed by determining the ratio (SRz/SRa). The detailed condition in one measurement and the data processing method were as follows.

(a) Minimum protrusion height ($Pa_{min}$, $Pb_{max}$), maximum protrusion height ($Pa_{max}$, $Pb_{max}$) (unit: nm)

The values derived from detection using the measuring apparatuses above were output as a histogram with 50-nm intervals. For example, a protrusion detected as a value of not smaller than 100 nm and smaller than 150 nm was counted to be included in a column that was indicated with a slice value (Z) of 150 nm. The minimum protrusion height was obtained as the lowest value of a slice width to which the first counted value (Z) belonged to. That is, when the first counted slice value (Z) belonged to a 150-nm column, the minimum protrusion height $P_{min}$ was 100 nm. In the same manner as above, the maximum protrusion height was obtained as the lowest value of a slice width to which the last counted slice value (Z) belonged to. That is, when the last counted slice value (Z) belonged to a 1000-nm column, the maximum protrusion height $P_{max}$ was 950 nm.

($Pa_{min}$ and $Pa_{max}$ are for surface A, while $Pb_{min}$ and $Pb_{max}$ are for surface B)

(b) Total number, Pa and Pb, of protrusions (unit: count/0.1 mm$^2$)

The total number of protrusions was the sum of the numbers of protrusions, after converted into counts per 0.1 mm$^2$, detected for the sampling intervals, in the transverse direction and in the machine direction, specified as items in the measurement condition paragraph.

Specifically, it was the sum of the counts in the histogram detected by the measuring apparatuses above.

(c) Number of protrusions, $Pa_{250-450}$ (count/0.1 mm$^2$), of not smaller than 250 nm and smaller than 450 nm on surface A This was the sum of the number of protrusions of a height within the range of not smaller than 250 nm and smaller than 450 nm detected on surface A in the histogram. Specifically, it was the sum of the counts in the columns corresponding to a slice value (Z) of 300 nm to 450 nm.

(d) Number of protrusions, $Pb_{450-1600}$ (count/0.1 mm$^2$), of not smaller than 450 nm and smaller than 1,600 nm on surface B The same as in (c) applied. Specifically, this was the sum of the counts in the columns corresponding to a slice value (Z) of 500 nm to 1,600 nm on surface B in the histogram. Measurement condition Treatment for the surface under measurement: Aluminum vacuum evaporation was performed to the surface under measurement by a non-contact method.

Measurement direction: the transverse direction of the film
Feed rate in the transverse direction: 0.1 mm/second
Range of measurement (transverse direction×machine direction): 1.0 mm×0.249 mm
Reference plane for the size in the height direction: LOWER (the lower side)
Sampling interval in the transverse direction: 2 μm
Sampling interval in the machine direction: 10 μm
Number of samples in the machine direction: 25
Cut-off: 0.25 mm/second
Magnification in the transverse direction: 200 times
Magnification in the machine direction: 20,000 times
Waves, roughness cut: None
Measurement Method Measurement of the film was performed using a specifically-designed sample holder. The sample holder was composed of two detachable metal plates having a circular hole in the center. A sample was sandwiched between them, and the film was immobilized by being affixed to all sides of the sample holder to measure the roughness of the film at the central circular portion.

Measurement Result: Data Processing

Measurement results obtained by the method are exemplified in Table 1. In the data in Table 1, each parameter is read as follows.

Surface A
SRa 39.4 nm
SRz 933 nm
$Pa_{min}$ 100 nm
$Pa_{max}$ 1,050 nm
$Pa_{250-450}$ 206/0.1 mm$^2$ (the number was rounded off to the nearest integer)
Pa 383/0.1 mm$^2$ (the number was rounded off to the nearest integer)
$Pa_{250-450}$/Pa 0.54
Surface B
SRa 41.1 nm
SRz 1,120 nm
$Pb_{mm}$ 200 nm
$Pb_{max}$ 1,200 nm
$Pb_{450-1600}$ 439/0.1 mm$^2$ (the number was rounded off to the nearest integer)
Pb 584/0.1 mm$^2$ (the number was rounded off to the nearest integer)
$Pb_{450-1600}$/Pb 0.75
Pa+Pb 967/0.1 mm$^2$ (the number was rounded off to the nearest integer)
|Pa−Pb|201/0.1 mm$^2$ (the number was rounded off to the nearest integer)

(10) Tensile Strength

Measurement was performed in conformance with JIS C-2330 (2001) 7.4.5 using a "TENSILON universal material testing machine (RTC-1310)" manufactured by ORIENTEC Co., Ltd.

(11) Film Resistance of Metal Film

A metallized film was cut into a rectangular piece measuring 10 mm in the machine direction and having the entire width (50 mm) in the transverse direction to obtain a sample, and the resistance of 30 mm across the metal film in the transverse direction was measured by a four-probe method. The value derived from the measurement was multiplied by the measurement width (10 mm) and was then divided by the distance (30 mm) between electrodes to calculate film resistance (surface electrical resistance) per 10 mm×10 mm. (unit: Ω/□)

(12) Film Dielectric Breakdown Voltage (V/μm)

In conformance with B method of JIS C2330 (2001) 7.4.11.2 (plate electrode method), the average value was determined and was then divided by the film thickness (μm) (as described above) of the sample measured by a micrometer method, indicated in V/μm.

(13) Processability into Element (Winding-into-Element Yield) in Capacitor Fabrication A biaxially stretched polypropylene film obtained in Example or Comparative Example described below was subjected to aluminum vacuum evaporation on one surface using a vacuum evaporation apparatus manufactured by ULVAC, Inc. to achieve film resistance of 8 Ω/sq. Evaporation was performed to form stripes that had margins in the machine direction (repeated pattern of a 39.0-mm-wide deposited area and a 1.0-mm-wide margin). Then, slits were made with a blade in the center of each deposited area and in the center of each margin to prepare a tape to be wound up having a total width of 20 mm that had a 0.5-mm margin on the left or on the right. Two of the resulting tapes, one having a left margin and one having a right margin, were overlaid one on another such that the deposited area lay off the edge of the margin by 0.5 mm in the transverse direction, and then the resultant was wound up to obtain a roll having capacitance of about 10 μF. Winding was performed using KAW-4NHB manufactured by KAIDO MANUFACTURING CO., LTD.

During fabrication of the capacitor, visual observation was performed from the beginning to the end of winding to reject ones with wrinkles or displacement. The percentage of the number of the rejected ones to the total fabrication quantity was used as an indicator of processability (hereinafter, called a winding-into-element yield). A high value of the winding-into-element yield is preferable; 95% or higher was regarded as excellent "○", lower than 95% and not lower than 80% was regarded as "Δ", and lower than 80% was regarded as poor "x". One regarded as "○" or "Δ" can be used practically.

(14) Evaluation of Properties of Metallized Capacitor

To the biaxially stretched polypropylene film obtained in Example or Comparative Example described below, an aluminum deposition pattern having film resistance of 8 Ω/sq and having what is called a T-shaped margin pattern consisted of margins in a direction vertical to the machine direction was provided using a vacuum evaporation apparatus manufactured by ULVAC, Inc., thereby obtaining a deposited tape of 50-mm wide.

The tape was then wound up by an element take-up apparatus (KAW-4NHB) manufactured by KAIDO MANUFACTURING CO., LTD. to obtain a capacitor element, which was subjected to metallikon and then to heat treatment under reduced pressure at a temperature of 105° C. for 10 hours, followed by being installed with a lead wire to complete the capacitor element. The capacitance of the capacitor element was 5 μF at this time.

Ten capacitor elements thus obtained were applied with voltage of 500 VDC at normal temperature, and after 10 minutes at the voltage, the voltage was raised at 50 VDC/minute, which were repeated to gradually raise the voltage stepwise. This was called a "step-up" test. The change in capacitance was measured to be plotted on a graph, and the voltage at which the capacitance reached 70% of the initial value was divided by the film thickness (described above) measured by a micrometer method. The resultant was used as dielectric strength evaluation, and one with a value of 300 V/μm or higher was regarded as usable. When the voltage was raised to make the capacitance reach 10% or lower of the initial value, the capacitor element was disassembled to examine its destruction state, followed by evaluating protective properties as follows:

◎: No change in the element shape, no through dielectric breakdown observed.

○: No change in the element shape, through dielectric breakdown not larger than 10 film layers observed.

Δ: A change observed in the element shape, or through dielectric breakdown exceeding 10 layers observed.

x: The element shape destroyed.

One regarded as ◎ can be used without problems, one regarded as ○ can be used depending on the conditions, and one regarded as Δ or x has a problem in use.

EXAMPLES

Our films, capacitors and methods will be described in detail by Examples. Properties were measured by the methods described above.

Example 1

To a linear polypropylene resin manufactured by Prime Polymer Co., Ltd. having a mesopentad fraction of 0.985 and a melt flow rate (MFR) of 2.6 g/10 minutes, 0.5% by mass of a branched polypropylene resin (polypropylene with high melt tension, Profax PF-814) manufactured by Basell was mixed, and the resultant was supplied to an extruder at a temperature of 250° C., followed by melt extrusion with a T-shaped slit die at a resin temperature of 250° C. to obtain a sheet. The melted sheet was cooled to solidification on a cooling drum with a diameter of 1 m maintained at 90° C. to obtain a non-stretched film. The sheet was maintained on the cooling roll for 2.5 seconds. Then, the non-stretched film was gradually preheated to 140° C., and while the temperature was maintained at 145° C., it was passed between rolls of different peripheral speeds to achieve stretching by a factor of 4.5 in the machine direction. During stretching, a radiation heater with power of 5 kW was provided in the area where stretching was taking place so as to add heat. Immediately after this, the film was passed between rolls maintained at 35° C. for rapid cooling. The film was then transferred to a tenter where the film was stretched by a factor of 10 in the transverse direction at a temperature of 158° C., and then the resultant was subjected to heat treatment at a temperature of 155° C. while relaxed at 6% in the transverse direction. Subsequently, the resultant was cooled to obtain a biaxially stretched polypropylene film with a film thickness of 3.0 μm. The surface of the film was subjected to corona discharge treatment at strength of 25 W·min/m² in the atmosphere. The stretching conditions for the biaxially stretched polypropylene film thus obtained are shown in Table 2, and the properties of the resulting film and the dielectric strength (dielectric breakdown voltage) and the processability into an element (winding-into-element yield) of a capacitor derived from the film are shown in Tables 3 and 4. As shown in Tables 3 and 4, a capacitor prepared with the biaxially stretched polypropylene film in Example 1 had excellent dielectric strength and protective properties.

Example 2

Film formation was performed in the same manner as in Example 1 except that the temperature of a cooling drum was 75° C. to obtain a biaxially stretched polypropylene film. The stretching conditions for the resulting biaxially stretched polypropylene film are shown in Table 2, and the properties of the resulting film are shown in Tables 3 and 4.

Example 3

Film formation was performed in the same manner as in Example 1 except that the temperature of a cooling drum was 95° C. and temperature-maintaining duration on the cooling drum was 1.7 seconds to obtain a biaxially stretched polypropylene film. The stretching conditions for the resulting biaxially stretched polypropylene film are shown in Table 2, and the properties of the resulting film are shown in Tables 3 and 4.

Example 4

Film formation was performed in the same manner as in Example 1 except that the temperature of a stretching roll was 139° C. to obtain a biaxially stretched polypropylene film. The stretching conditions for the resulting biaxially stretched polypropylene film are shown in Table 2, and the properties of the resulting film are shown in Tables 3 and 4.

Example 5

Film formation was performed in the same manner as in Example 1 except that the power of a radiation heater was 11 kW to obtain a biaxially stretched polypropylene film. The stretching conditions for the resulting biaxially stretched polypropylene film are shown in Table 2, and the properties of the resulting film are shown in Tables 3 and 4.

Example 6

Film formation was performed in the same manner as in Example 1 except that the temperature of a cooling drum was 85° C., temperature-maintaining duration on the cooling drum was 2.0 seconds, the temperature of a stretching roll was 147° C., and a film thickness was 2.0 μm to obtain a biaxially stretched polypropylene film. The stretching conditions for the resulting biaxially stretched polypropylene film are shown in Table 2, and the properties of the resulting film are shown in Tables 3 and 4.

Example 7

Film formation was performed in the same manner as in Example 1 except that a stretch ratio was 5.3 to obtain a biaxially stretched polypropylene film. The stretching conditions for the resulting biaxially stretched polypropylene film are shown in Table 2, and the properties of the resulting film are shown in Tables 3 and 4.

Example 8

Film formation was performed in the same manner as in Example 1 except that both surface A and surface B of the film were subjected to corona discharge treatment at strength of 25 W·min/m² in the atmosphere to obtain a biaxially stretched polypropylene film. The film was subjected to aluminum evaporation on both surface A and surface B to obtain a capacitor. The stretching conditions for the resulting biaxially stretched polypropylene film are shown in Table 2, and the properties of the resulting film are shown in Tables 3 and 4.

Example 9

Film formation was performed in the same manner as in Example 1 except that the temperature of a stretching roll was 147° C., a cooling temperature after stretching was 45° C., and a film thickness was 2.8 μm to obtain a biaxially stretched polypropylene film. The stretching conditions for the resulting biaxially stretched polypropylene film are shown in Table 2, and the properties of the resulting film are shown in Tables 3 and 4.

Example 10

Film formation was performed in the same manner as in Example 1 except that a stretch ratio was 4.2 to obtain a biaxially stretched polypropylene film. The stretching conditions for the resulting biaxially stretched polypropylene film are shown in Table 2, and the properties of the resulting film are shown in Tables 3 and 4.

Example 11

Film formation was performed in the same manner as in Example 1 except that the temperature of a cooling drum was 95° C., the temperature of a stretching roll was 147° C., the power of a radiation heater was 8 kW, and a cooling temperature after stretching was 45° C. to obtain a biaxially stretched polypropylene film. The stretching conditions for the resulting biaxially stretched polypropylene film are shown in Table 2, and the properties of the resulting film are shown in Tables 3 and 4.

Comparative Example 1

Film formation was performed in the same manner as in Example 1 except that the temperature of a cooling drum was 65° C. to obtain a biaxially stretched polypropylene film. The stretching conditions for the resulting biaxially stretched polypropylene film are shown in Table 2, and the properties of the resulting film are shown in Tables 3 and 4.

Comparative Example 2

Film formation was performed in the same manner as in Example 1 except that the temperature of a cooling drum was 100° C. and temperature-maintaining duration was 1.2 seconds to obtain a biaxially stretched polypropylene film. The stretching conditions for the resulting biaxially stretched polypropylene film are shown in Table 2, and the properties of the resulting film are shown in Tables 3 and 4.

Comparative Example 3

Film formation was performed in the same manner as in Example 1 except that the temperature of a stretching roll was 128° C. to obtain a biaxially stretched polypropylene film. The stretching conditions for the resulting biaxially stretched polypropylene film are shown in Table 2, and the properties of the resulting film are shown in Tables 3 and 4.

Comparative Example 4

Film formation was performed in the same manner as in Example 1 except that stretching was performed in the machine direction without adding heat with a radiation heater to obtain a biaxially stretched polypropylene film. The stretching conditions for the resulting biaxially stretched polypropylene film are shown in Table 2, and the properties of the resulting film are shown in Tables 3 and 4.

Comparative Example 5

Film formation was performed in the same manner as in Example 1 except that the temperature of a cooling drum was 80° C. and a film thickness was 5.0 µm to obtain a biaxially stretched polypropylene film. The stretching conditions for the resulting biaxially stretched polypropylene film are shown in Table 2, and the properties of the resulting film are shown in Tables 3 and 4.

Comparative Example 6

Film formation was performed in the same manner as in Example 1 except that a stretch ratio was 3.5 to obtain a biaxially stretched polypropylene film. The stretching conditions for the resulting biaxially stretched polypropylene film are shown in Table 2, and the properties of the resulting film are shown in Tables 3 and 4.

Comparative Example 7

Film formation was performed in the same manner as in Example 1 except that the temperature (cooling temperature) of a roll right after stretching was 90° C. to obtain a biaxially stretched polypropylene film. The stretching conditions for the resulting biaxially stretched polypropylene film are shown in Table 2, and the properties of the resulting film are shown in Tables 3 and 4.

Comparative Example 8

Film formation was performed in the same manner as in Example 1 except that the temperature of a cooling drum was 95° C., temperature-maintaining duration was 1.0 seconds, the temperature of a stretching roll was 147° C., the power of a radiation heater was 14 kW, and a cooling temperature after stretching was 47° C. to obtain a biaxially stretched polypropylene film. The stretching conditions for the resulting biaxially stretched polypropylene film are shown in Table 2, and the properties of the resulting film are shown in Tables 3 and 4.

Comparative Example 9

Film formation was performed in the same manner as in Example 1 except that the temperature of a stretching roll was 135° C., the amount of heat from a radiation heater was 2 kW, and a stretch ratio was 5.7 to obtain a biaxially stretched polypropylene film. The stretching conditions for the resulting biaxially stretched polypropylene film are shown in Table 2, and the properties of the resulting film are shown in Tables 3 and 4.

TABLE 1

|  | Surface A | Surface B |
|---|---|---|
| SRa [nm] | 39.4 | 41.1 |
| SRz [nm] | 933 | 1120 |
| SRmax [nm] | 1100 | 1275 |
| M-AREA [mm$^2$] | 0.249 | 0.249 |
| S-AREA [mm$^2$] | 0.1 | 0.1 |
| Z [nm] | COUNT [count/0.1 mm$^2$] | COUNT [count/0.1 mm$^2$] |
| 50 | 0.0000 | 0.0000 |
| 100 | 0.0000 | 0.0000 |
| 150 | 0.80321 | 0.0000 |
| 200 | 2.81124 | 0.0000 |
| 250 | 45.3814 | 0.4016 |
| 300 | 79.5179 | 0.4016 |
| 350 | 50.2007 | 0.8032 |
| 400 | 40.1606 | 35.7429 |
| 450 | 35.7429 | 107.6300 |
| 500 | 29.3172 | 81.9276 |
| 550 | 24.0963 | 68.6746 |
| 600 | 19.6786 | 57.8312 |
| 650 | 16.0642 | 51.4055 |
| 700 | 12.8513 | 43.7750 |
| 750 | 10.0401 | 35.3413 |
| 800 | 7.63051 | 28.9156 |
| 850 | 4.41766 | 21.2851 |
| 900 | 2.40963 | 15.6626 |
| 950 | 0.80321 | 12.4497 |
| 1000 | 0.4016 | 8.0321 |
| 1050 | 0.4016 | 5.6225 |
| 1100 | 0.4016 | 4.0161 |
| 1150 | 0.0000 | 2.4096 |
| 1200 | 0.0000 | 1.6064 |
| 1250 | 0.0000 | 0.4016 |
| 1300 | 0.0000 | 0.0000 |
| 1350 | 0.0000 | 0.0000 |
| 1400 | 0.0000 | 0.0000 |
| 1450 | 0.0000 | 0.0000 |
| 1500 | 0.0000 | 0.0000 |
| 1550 | 0.0000 | 0.0000 |
| 1600 | 0.0000 | 0.0000 |
| 1650 | 0.0000 | 0.0000 |
| 1700 | 0.0000 | 0.0000 |
| Total | 383.13146 | 584.33582 |

TABLE 2

|  | Cooling drum (° C.) | Maintaining duration (second) | Temperature of stretching roll (° C.) | Radiation heater (kW) | Stretch ratio (times) | Cooling temperature after stretching (° C.) | Thickness t1 (µm) |
|---|---|---|---|---|---|---|---|
| Example 1 | 90 | 2.5 | 145 | 5 | 4.5 | 35 | 3.0 |
| Example 2 | 75 | 2.5 | 145 | 5 | 4.5 | 35 | 3.0 |
| Example 3 | 95 | 1.7 | 145 | 5 | 4.5 | 35 | 3.0 |
| Example 4 | 90 | 2.5 | 139 | 5 | 4.5 | 35 | 3.0 |
| Example 5 | 90 | 2.5 | 145 | 11 | 4.5 | 35 | 3.0 |
| Example 6 | 85 | 2.0 | 147 | 5 | 4.5 | 35 | 2.0 |
| Example 7 | 90 | 2.5 | 145 | 5 | 5.3 | 35 | 3.0 |
| Example 8 | 90 | 2.5 | 145 | 5 | 4.5 | 35 | 3.0 |
| Example 9 | 90 | 2.5 | 147 | 5 | 4.5 | 45 | 2.8 |
| Example 10 | 90 | 2.5 | 145 | 5 | 4.2 | 35 | 3.0 |
| Example 11 | 95 | 2.5 | 147 | 8 | 4.5 | 45 | 3.0 |
| Comp. Ex. 1 | 65 | 2.5 | 145 | 5 | 4.5 | 35 | 3.0 |
| Comp. Ex. 2 | 100 | 1.2 | 145 | 5 | 4.5 | 35 | 3.0 |
| Comp. Ex. 3 | 90 | 2.5 | 128 | 5 | 4.5 | 35 | 3.0 |
| Comp. Ex. 4 | 90 | 2.5 | 145 | 0 | 4.5 | 35 | 3.0 |
| Comp. Ex. 5 | 80 | 2.5 | 145 | 5 | 4.5 | 35 | 5.0 |
| Comp. Ex. 6 | 90 | 2.5 | 145 | 5 | 3.5 | 35 | 3.0 |

TABLE 2-continued

| | Cooling drum (° C.) | Maintaining duration (second) | Temperature of stretching roll (° C.) | Radiation heater (kW) | Stretch ratio (times) | Cooling temperature after stretching (° C.) | Thickness t1 (μm) |
|---|---|---|---|---|---|---|---|
| Comp. Ex. 7 | 90 | 2.5 | 145 | 5 | 4.5 | 90 | 3.0 |
| Comp. Ex. 8 | 95 | 1.0 | 147 | 14 | 4.5 | 47 | 3.0 |
| Comp. Ex. 9 | 90 | 2.5 | 135 | 2 | 5.7 | 35 | 3.0 |

TABLE 3

| | Pmin (nm) | | Pmax (nm) | | SRa (nm) | | SRz (nm) | | SRz/SRa | |
|---|---|---|---|---|---|---|---|---|---|---|
| | Surface A | Surface B | Surface A | Surface B | Surface A | Surface B | Surface A | Surface B | Surface A | Surface B |
| Example 1 | 150 | 250 | 1050 | 1200 | 39.4 | 41.1 | 933 | 1120 | 23.7 | 27.3 |
| Example 2 | 100 | 200 | 900 | 1100 | 23.2 | 34.2 | 750 | 998 | 32.3 | 29.2 |
| Example 3 | 100 | 200 | 1100 | 1200 | 40.0 | 42.0 | 950 | 1200 | 23.8 | 28.6 |
| Example 4 | 150 | 200 | 950 | 1100 | 34.7 | 39.2 | 812 | 1050 | 23.4 | 26.8 |
| Example 5 | 150 | 300 | 1100 | 1500 | 38.2 | 47.2 | 922 | 1350 | 24.1 | 28.6 |
| Example 6 | 150 | 250 | 1100 | 1400 | 31.1 | 42.0 | 870 | 1150 | 28.0 | 27.4 |
| Example 7 | 200 | 300 | 1100 | 1250 | 40.1 | 42.0 | 940 | 1150 | 23.4 | 27.4 |
| Example 8 | 100 | 250 | 1000 | 1150 | 37.5 | 40.4 | 920 | 1100 | 24.5 | 27.2 |
| Example 9 | 150 | 250 | 1100 | 1250 | 39.5 | 42.5 | 940 | 1170 | 23.8 | 27.5 |
| Example 10 | 150 | 200 | 1000 | 1100 | 38.2 | 40.0 | 930 | 1100 | 24.3 | 27.5 |
| Example 11 | 200 | 350 | 1150 | 1600 | 40.5 | 45.0 | 990 | 1200 | 24.4 | 26.7 |
| Comp. Ex. 1 | 50 | 50 | 650 | 750 | 11.5 | 12.2 | 450 | 470 | 39.1 | 38.5 |
| Comp. Ex. 2 | 250 | 250 | 1200 | 1200 | 42.0 | 44.0 | 970 | 1300 | 23.1 | 29.5 |
| Comp. Ex. 3 | 50 | 50 | 600 | 650 | 14.2 | 20.1 | 480 | 501 | 33.8 | 24.9 |
| Comp. Ex. 4 | 150 | 150 | 950 | 1000 | 34.7 | 35.0 | 820 | 910 | 23.6 | 26.0 |
| Comp. Ex. 5 | 150 | 100 | 1000 | 950 | 35.0 | 33.0 | 880 | 900 | 25.1 | 27.3 |
| Comp. Ex. 6 | 150 | 200 | 1000 | 1150 | 38.0 | 39.0 | 921 | 1030 | 24.2 | 26.4 |
| Comp. Ex. 7 | 200 | 300 | 1200 | 1250 | 40.5 | 42.0 | 960 | 1220 | 23.7 | 29.0 |
| Comp. Ex. 8 | 250 | 350 | 1300 | 1700 | 43.0 | 55.0 | 1000 | 1550 | 23.3 | 28.2 |
| Comp. Ex. 9 | 100 | 150 | 850 | 1000 | 25.0 | 35.0 | 780 | 1000 | 31.2 | 28.6 |

TABLE 4

| | $Pa_{250-450}/Pa$ | $Pb_{450-1600}/Pb$ | $|Pa - Pb|$ (count/ 0.1 mm²) | $Pa + Pb$ (count/ 0.1 mm²) | Tensile strength (Mpa) | | Film dielectric breakdown voltage (V/μm) | Winding-into-element yield | Capacitor characteristics | |
|---|---|---|---|---|---|---|---|---|---|---|
| | | | | | Machine direction | Transverse direction | | | Dielectric strength (V/μm) | Protective properties |
| Example 1 | 0.54 | 0.75 | 201 | 967 | 190 | 330 | 640 | ○ | 460 | ◎ |
| Example 2 | 0.52 | 0.70 | 190 | 820 | 195 | 345 | 655 | ○ | 492 | ◎ |
| Example 3 | 0.55 | 0.80 | 122 | 1010 | 187 | 325 | 610 | Δ | 430 | ◎ |
| Example 4 | 0.58 | 0.73 | 114 | 750 | 210 | 355 | 660 | ○ | 480 | ○ |
| Example 5 | 0.75 | 0.92 | 254 | 970 | 175 | 295 | 635 | ○ | 435 | ◎ |
| Example 6 | 0.79 | 0.95 | 220 | 690 | 185 | 310 | 630 | ○ | 480 | ◎ |
| Example 7 | 0.57 | 0.78 | 207 | 977 | 240 | 365 | 652 | ○ | 498 | ◎ |
| Example 8 | 0.58 | 0.70 | 195 | 1005 | 192 | 333 | 645 | ○ | 465 | ◎ |
| Example 9 | 0.51 | 0.81 | 180 | 980 | 180 | 310 | 605 | ○ | 400 | ◎ |
| Example 10 | 0.55 | 0.78 | 206 | 952 | 150 | 280 | 630 | ○ | 410 | ◎ |
| Example 11 | 0.51 | 0.88 | 220 | 1150 | 188 | 330 | 620 | ○ | 402 | ◎ |
| Comp. Ex. 1 | 0.32 | 0.44 | 90 | 320 | 154 | 275 | 710 | x | 550 | x |
| Comp. Ex. 2 | 0.20 | 0.90 | 100 | 1150 | 200 | 345 | 550 | x | 345 | ◎ |
| Comp. Ex. 3 | 0.25 | 0.42 | 80 | 400 | 250 | 395 | 705 | x | 546 | x |
| Comp. Ex. 4 | 0.60 | 0.32 | 110 | 520 | 235 | 350 | 650 | Δ | 470 | x |
| Comp. Ex. 5 | 0.72 | 0.29 | 90 | 450 | 205 | 348 | 680 | ○ | 530 | x |
| Comp. Ex. 6 | 0.56 | 0.72 | 205 | 977 | 110 | 240 | 520 | ○ | 335 | x |
| Comp. Ex. 7 | 0.38 | 0.82 | 95 | 990 | 170 | 294 | 530 | x | 340 | ○ |
| Comp. Ex. 8 | 0.45 | 0.92 | 280 | 1250 | 200 | 312 | 510 | Δ | 280 | ◎ |
| Comp. Ex. 9 | 0.60 | 0.55 | 200 | 780 | 270 | 420 | 690 | ○ | 500 | x |

The invention claimed is:

1. A biaxially stretched polypropylene film comprising protrusions on both surfaces, and having a thickness t1 of 1 μm to 3 μm, a tensile strength in a machine direction of 120 MPa to 250 MPa, a tensile strength in a transverse direction of 250 MPa to 400 MPa, a minimum protrusion height $P_{min}$ of 100 nm or greater and a maximum protrusion height $P_{max}$ of 1,600 nm or smaller for either surface, and satisfying all of Formulae (1) to (3) when one of the surfaces is surface A and another is surface B:

$$0.5 \leq Pa_{250-450}/Pa \leq 1.0 \quad (1)$$

$$0.5 \leq Pb_{450-1600}/Pb \leq 1.0 \quad (2)$$

$$600 \leq Pa + Pb \leq 1{,}200 \quad (3)$$

in Formulae (1) to (3), $Pa_{250-450}$ is a number of protrusions with a height of not smaller than 250 nm and smaller than 450 nm per 0.1 mm² on surface A, $Pb_{450-1600}$ is a number of protrusions with a height of not smaller than 450 nm and smaller than 1600 nm per 0.1 mm² on surface B, Pa is a number of protrusions per 0.1 mm² on surface A, and Pb is a number of protrusions per 0.1 mm² on surface B.

2. The biaxially stretched polypropylene film according to claim 1, wherein Pa and Pb satisfy Formula (4):

$$|Pa-Pb| \geq 100 \qquad (4).$$

3. The biaxially stretched polypropylene film according to claim 1, wherein ten-point average roughness (SRz) is not lower than 500 nm and not higher than 1,500 nm for either surface.

4. The biaxially stretched polypropylene film according to claim 1, wherein center line surface roughness (SRa) is not lower than 20 nm and not higher than 50 nm for either surface.

5. The biaxially stretched polypropylene film according to claim 1, wherein a value of a ratio SRz/SRa of center line surface roughness (SRa) to ten-point average roughness (SRz) is not lower than 20 and not higher than 40 for either surface.

6. The biaxially stretched polypropylene film according to claim 1, which contains 0.05% by mass to 10% by mass of a branched polypropylene.

7. A metallized film produced by providing a metal film to at least one surface of a biaxially stretched polypropylene film comprising protrusions on both surfaces, and having a thickness t1 of 1 μm to 3 μm, a tensile strength in a machine direction of 120 MPa to 250 MPa, a tensile strength in a transverse direction of 250 MPa to 400 MPa, a minimum protrusion height $P_{min}$ of 100 nm or greater and a maximum protrusion height $P_{max}$ of 1,600 nm or smaller for either surface, and satisfying all of Formulae (1) to (3) when one of the surfaces is surface A and another is surface B:

$$0.5 \leq Pa_{250-450}/Pa \leq 1.0 \qquad (1)$$

$$0.5 \leq Pb_{450-1600}/Pb \leq 1.0 \qquad (2)$$

$$600 \leq Pa+Pb \leq 1,200 \qquad (3)$$

in Formulae (1) to (3), $Pa_{250-450}$ is a number of protrusions with a height of not smaller than 250 nm and smaller than 450 nm per 0.1 mm² on surface A, $Pb_{450-1600}$ is a number of protrusions with a height of not smaller than 450 nm and smaller than 1600 nm per 0.1 mm² on surface B, Pa is a number of protrusions per 0.1 mm² on surface A, and Pb is a number of protrusions per 0.1 mm² on surface B.

8. The metallized film according to claim 7, wherein the metal film is provided on both surfaces of the biaxially stretched polypropylene film.

9. The metallized film according to claim 7, wherein a surface electrical resistance of the metal film is 1Ω/□ to 20 Ω/□.

10. A film capacitor formed of a metallized film produced by providing a metal film on at least one surface of a biaxially stretched polypropylene film comprising protrusions on both surfaces, and having a thickness t1 of 1 μm to 3 μm, a tensile strength in a machine direction of 120 MPa to 250 MPa, a tensile strength in a transverse direction of 250 MPa to 400 MPa, a minimum protrusion height $P_{min}$ of 100 nm or greater and a maximum protrusion height $P_{max}$ of 1,600 nm or smaller for either surface, and satisfying all of Formulae (1) to (3) when one of the surfaces is surface A and another is surface B:

$$0.5 \leq Pa_{250-450}/Pa \leq 1.0 \qquad (1)$$

$$0.5 \leq Pb_{450-1600}/Pb \leq 1.0 \qquad (2)$$

$$600 \leq Pa+Pb \leq 1,200 \qquad (3)$$

in Formulae (1) to (3), $Pa_{250-450}$ is a number of protrusions with a height of not smaller than 250 nm and smaller than 450 nm per 0.1 mm² on surface A, $Pb_{450-1600}$ is a number of protrusions with a height of not smaller than 450 nm and smaller than 1600 nm per 0.1 mm² on surface B, Pa is a number of protrusions per 0.1 mm² on surface A, and Pb is a number of protrusions per 0.1 mm² on surface B.

* * * * *